United States Patent
Fan et al.

(10) Patent No.: US 11,009,487 B2
(45) Date of Patent: May 18, 2021

(54) MULTI-MODAL BIOSENSOR HAVING AN ACOUSTIC DETECTOR WITH INTEGRATED OPTICAL INTERFEROMETRY

(71) Applicants: THE REGENTS OF THE UNIVERSITY OF MICHIGAN, Ann Arbor, MI (US); OAKLAND UNIVERSITY, Rochester, MI (US)

(72) Inventors: Xudong Fan, Saline, MI (US); Zhizheng Zhang, Ann Arbor, MI (US); Xiangqun Zeng, Rochester Hills, MI (US)

(73) Assignees: THE REGENTS OF THE UNIVERSITY OF MICHIGAN, Ann Arbor, MI (US); OAKLAND UNIVERSITY, Rochester, MI (US)

( * ) Notice: Subject to any disclaimer, the term of this patent is extended or adjusted under 35 U.S.C. 154(b) by 208 days.

(21) Appl. No.: 16/334,214

(22) PCT Filed: Sep. 19, 2017

(86) PCT No.: PCT/US2017/052287
§ 371 (c)(1),
(2) Date: Mar. 18, 2019

(87) PCT Pub. No.: WO2018/053514
PCT Pub. Date: Mar. 22, 2018

(65) Prior Publication Data
US 2019/0277811 A1     Sep. 12, 2019

Related U.S. Application Data

(60) Provisional application No. 62/396,534, filed on Sep. 19, 2016.

(51) Int. Cl.
*G01N 29/44* (2006.01)
*G01N 29/02* (2006.01)
(Continued)

(52) U.S. Cl.
CPC ......... *G01N 29/4472* (2013.01); *G01N 21/45* (2013.01); *G01N 21/554* (2013.01);
(Continued)

(58) Field of Classification Search
CPC .. G01N 29/4472; G01N 29/00; G01N 29/022; G01N 29/036; G01N 29/221;
(Continued)

(56) References Cited

U.S. PATENT DOCUMENTS

| 2002/0094531 A1 | 7/2002 | Zenhausern |
| 2005/0003560 A1 | 1/2005 | Zeng et al. |

(Continued)

FOREIGN PATENT DOCUMENTS

WO  WO-2008122960 A2  10/2008

OTHER PUBLICATIONS

V.H. Niri et al "Simultaneous Monitoring of Electroformation of Phospholipid Vesicles by Quartz Crystal Microbalance and Optical Microscop" Chem. Phys. Lipids. Jan. 2010; 163(1):36-41.
(Continued)

*Primary Examiner* — Suman K Nath
(74) *Attorney, Agent, or Firm* — Harness, Dickey & Pierce, P.L.C.

(57) ABSTRACT

A multi-modal biosensor system includes a vibrating plate orientated along a plane. An actuator is interfaced with the vibrating plate and operable to vibrate the vibrating plate along the plane. The actuator includes two electrodes rigidly affixed to the vibrating plate. An optical support structure is rigidly affixed to the vibrating plate, and provides an outwardly facing surface to receive a measurement sample. A light source is configured to project light onto the outwardly facing surface of the optical support structure. A light detector is configured to capture light reflected from the outwardly facing surface of the optical support structure. A
(Continued)

controller interfaces with the two electrodes and the light detector. The controller operates to detect changes in the vibrating motion of the vibrating plate concurrently with detecting changes in the light captured by the light detector.

26 Claims, 10 Drawing Sheets

(51) Int. Cl.
| | | |
|---|---|---|
| *G01N 21/45* | (2006.01) | |
| *G01N 21/552* | (2014.01) | |
| *G01N 29/036* | (2006.01) | |
| *G01N 29/22* | (2006.01) | |
| *G01N 29/00* | (2006.01) | |

(52) U.S. Cl.
CPC ............ *G01N 29/00* (2013.01); *G01N 29/022* (2013.01); *G01N 29/036* (2013.01); *G01N 29/221* (2013.01); *G01N 2291/014* (2013.01); *G01N 2291/0423* (2013.01); *G01N 2291/0426* (2013.01); *G01N 2291/0427* (2013.01)

(58) Field of Classification Search
CPC ................. G01N 21/45; G01N 21/554; G01N 2291/014; G01N 2291/0423; G01N 2291/0426; G01N 2291/0427
See application file for complete search history.

(56) References Cited

U.S. PATENT DOCUMENTS

| | | | |
|---|---|---|---|
| 2011/0122410 A1 | 5/2011 | Wang et al. | |
| 2011/0211316 A1 | 9/2011 | La Rosa | |
| 2012/0043203 A1 | 2/2012 | Lin et al. | |
| 2013/0255389 A1* | 10/2013 | Watanabe | ............ G01N 29/00 73/655 |
| 2013/0263669 A1* | 10/2013 | Nakanishi | ............... G01H 9/00 73/655 |
| 2014/0070088 A1 | 3/2014 | Otsuka | |
| 2014/0102204 A1* | 4/2014 | Akiyama | ............ A61B 5/0095 73/655 |
| 2014/0134607 A1 | 5/2014 | Lin et al. | |

OTHER PUBLICATIONS

International Search Report and Written Opinion of the International Searching Authority issued in PCT/US2017/052287, dated Feb. 7, 2018; ISA/KR.

* cited by examiner

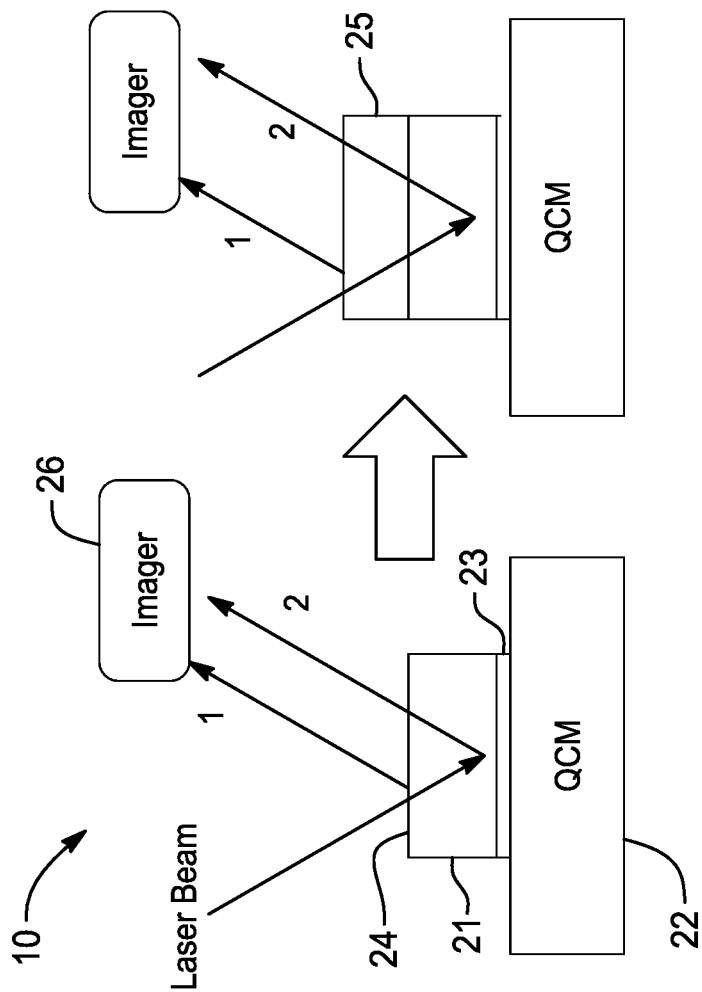
FIG. 2A
FIG. 2B
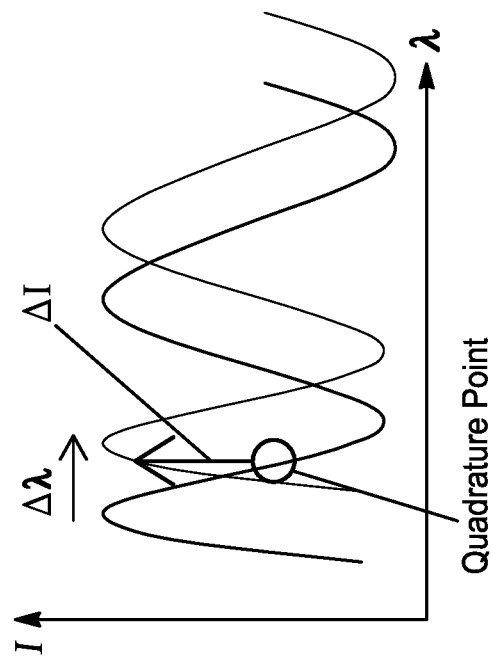
FIG. 2C

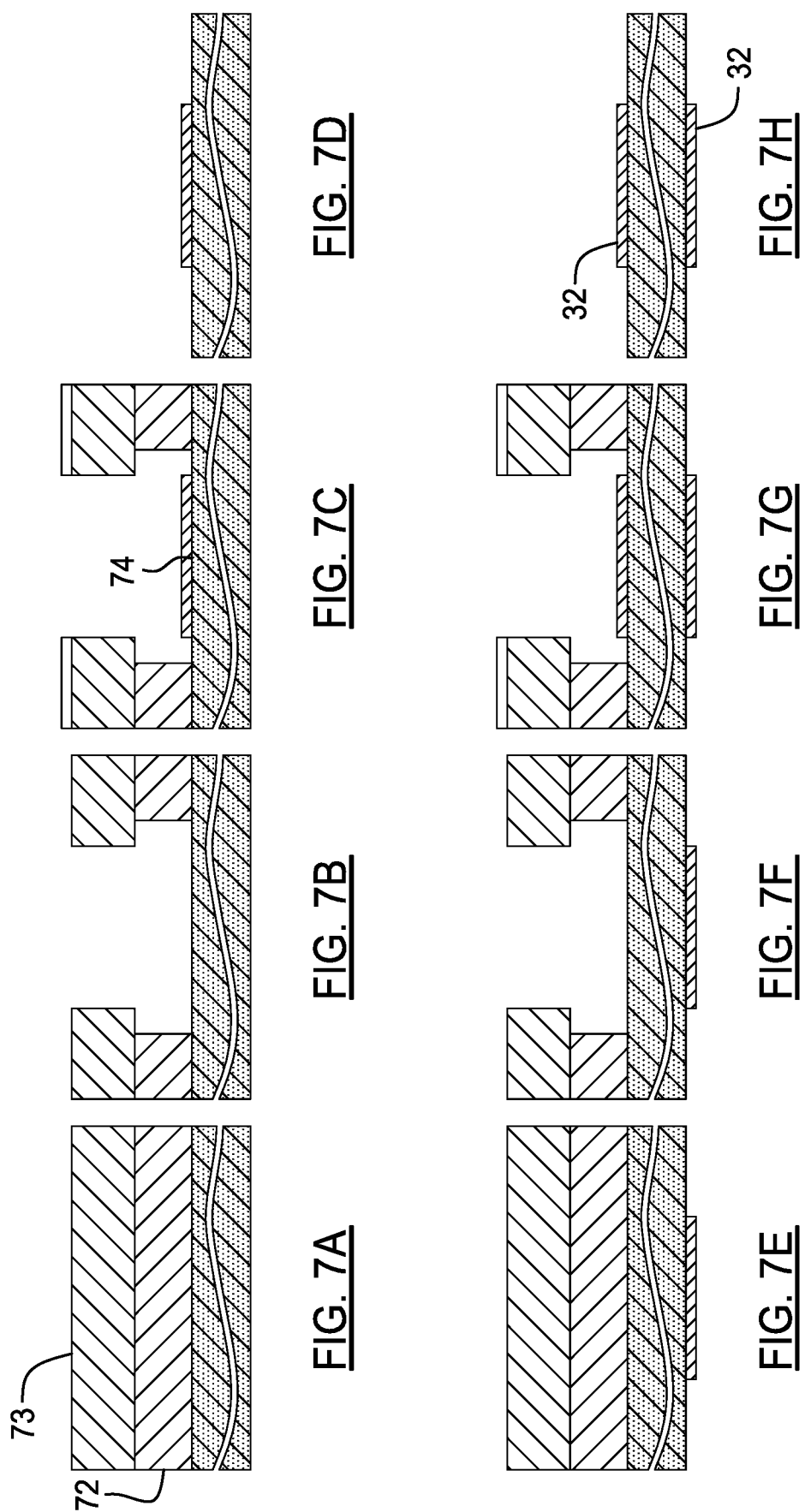

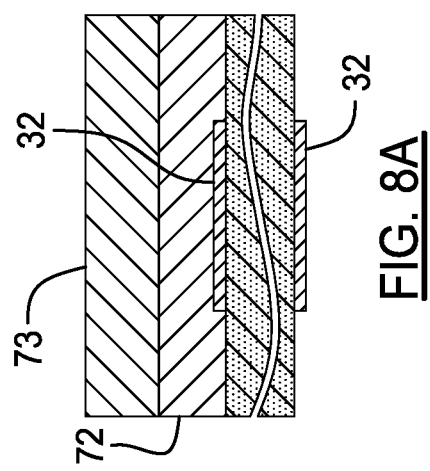
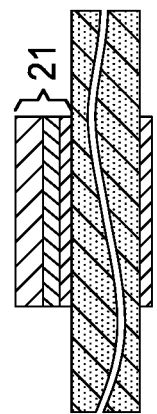
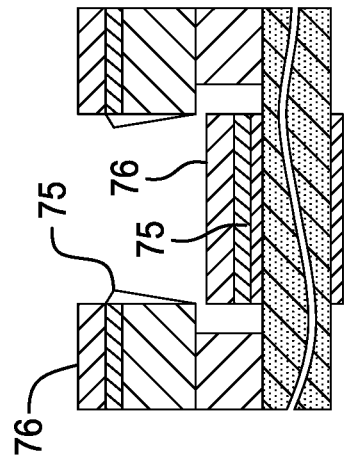

MULTI-MODAL BIOSENSOR HAVING AN ACOUSTIC DETECTOR WITH INTEGRATED OPTICAL INTERFEROMETRY

CROSS-REFERENCE TO RELATED APPLICATIONS

This application is the U.S. National Phase Application under 35 U.S.C. 371 of International Application No. PCT/US2017/052287, filed Sep. 19, 2017, which claims the benefit of U.S. Provisional Application No. 62/396,534, filed on Sep. 19, 2016. The entire disclosures of the above applications are incorporated herein by reference.

GOVERNMENT CLAUSE

This invention was made with government support under Grant Nos. CBET1158638 and CMMI1265164 awarded by the National Science Foundation. The Government has certain rights in this invention.

FIELD

The present disclosure relates to a multi-modal biosensor capable of providing consistent and complementary information of bio-interactions in a rapid and multiplexed manner.

BACKGROUND

Biological molecular interactions (or bio-interactions) such as protein-protein interactions are central to virtually every process in a living cell. Bio-interaction is a complex process that involves a variety of weak forces (e.g., non-covalent bonds, hydrogen-bonding, and hydrophobic interactions), structural complementarities, and conformational changes. To understand the mechanisms of bio-interactions requires tools to quantitatively assess the binding reactions so that the thermodynamics, kinetics, and structural complementarity of the bio-interactions can be obtained. Two types of assays are commonly used to quantitatively analyze bio-interactions: assays that directly monitor the bio-interactions in solutions such as isothermal titration calorimetry (ITC); and assays in which a biomolecule is immobilized on a solid substrate such as surface plasmon resonance (SPR). Even though each assay can provide quantitative information about the binding reactions, nearly all existing methods provide only certain aspects of complicated bio-interaction processes. Often multiple techniques are needed to obtain different information of the binding reactions so that the mechanistic details can be pieced together using data from different experiments. This type of approach is not only slow and complicated, but also can easily lead to inaccurate or erroneous conclusions drawn from different experimental results. Therefore, an integrated multi-modal biosensor capable of providing consistent and complementary information of bio-interactions in a rapid and multiplexed manner is highly desirable for fundamental and applied biomedical research.

Label free biosensors are uniquely positioned to allow for real time monitoring of bio-interactions in their natural states. However, nearly all existing label free biosensors (such as optical, acoustic, mechanical, electrochemical, and electrical sensors) rely on a single transduction principle that reflects only one aspect of complicated bio-interaction processes. This may lead to inaccurate or erroneous conclusions regarding the bio-interactions drawn from the experimental results. An integrated multi-modal label free biosensor capable of providing consistent and complementary information about bio-interactions in a rapid and multiplexed manner would be highly desirable for fundamental and applied biomedical research.

This section provides background information related to the present disclosure which is not necessarily prior art.

SUMMARY

This section provides a general summary of the disclosure, and is not a comprehensive disclosure of its full scope or all of its features.

A multi-modal biosensor system includes a vibrating plate orientated along a plane. An actuator is interfaced with the vibrating plate and operable to vibrate the vibrating plate along the plane. The actuator includes two electrodes rigidly affixed to the vibrating plate. An optical support structure is rigidly affixed to the vibrating plate, and provides an outwardly facing surface to receive a measurement sample. A light source is configured to project light onto the outwardly facing surface of the optical support structure. A light detector is configured to capture light reflected from the outwardly facing surface of the optical support structure. A controller interfaces with the two electrodes and the light detector. The controller operates to detect changes in the vibrating motion of the vibrating plate concurrently with detecting changes in the light captured by the light detector.

In some embodiments, the two electrodes are comprised of a top electrode and a bottom electrode coated on opposite surfaces of the vibrating plate.

In some embodiments, an optical isolation layer is coated on the top electrode on which the optical support rests, to prevent light from reaching the top electrode.

In some embodiments, the vibrating plate is comprised of piezoelectric material.

In some embodiments, the actuator causes the vibrating plate to vibrate in one of the following modes: thickness-shear-mode, flexural-plate-wave-mode, surface-acoustic-wave-mode, or shear-horizontal-acoustic-plate-mode.

In some embodiments, the light source is further configured to project light on an oblique angle onto the outwardly facing surface of the optical support structure. The incident (and reflected) light has one component perpendicular and one component parallel to the plane of incidence, which is normal to an outwardly facing surface of the vibrating plate.

In some embodiments, the optical support structure is comprised of at least one layer of dielectric material.

In some embodiments, the optical support structure is comprised of a grating material.

In some embodiments, the optical support structure is comprised of alternating layers of dielectric material and metal material.

In some embodiments, mass of the optical support structure is less than ten percent of mass of the vibrating plate.

In some embodiments, the thickness of the optical support structure is on the order of two microns.

In some embodiments, the thickness of the optical support structure is less than ten microns.

In some embodiments, the optical support structure is comprised of two layers of a metal material separated by an insulating layer.

In some embodiments, the optical support structure is further defined by a layer of silicon deposited on the top electrode, a layer of titanium dioxide deposited on the layer of silicon, and a layer of silicon dioxide deposited on the layer of titanium dioxide.

In another form, the present disclosure provides a biosensor that includes a vibrating plate orientated along a plane and the vibrating plate comprises of a piezoelectric material. An actuator is interfaced with the vibrating plate and operated to cause the vibrating plate to vibrate along the plane. The actuator includes two electrodes rigidly affixed on opposing surfaces of the vibrating plate. An optical support structure is rigidly affixed to the vibrating plate, and provides an outwardly facing surface to receive a measurement sample. A light source is configured to project light onto the outwardly facing surface of the optical support structure. A light detector is configured to capture light reflected from the outwardly facing surface of the optical support structure. An optical isolation layer is coated on a top electrode of the two electrodes and prevents light from reaching the top electrode. A controller interfaces with the two electrodes and the light detector. The controller operates to detect changes in vibrating motion of the vibrating plate concurrently with detecting changes in the light captured by the light detector.

In some embodiments, the piezoelectric material is comprised of quartz. In some embodiments, the actuator causes the vibrating plate to vibrate in one of the following modes: thickness-shear-mode, flexural-plate-wave-mode, surface-acoustic-wave-mode, or shear-horizontal-acoustic-plate-mode.

In some embodiments, the optical support structure is comprised of a grating material.

In some embodiments, the optical support structure is comprised of alternating layers of dielectric material and metal material.

In some embodiments, mass of the optical support structure is less than ten percent of mass of the vibrating plate.

In some embodiments, thickness of the optical support structure is on the order of two microns.

In some embodiments, thickness of the optical support structure is less than ten microns.

In some embodiments, the optical support structure is comprised of two layers of a metal material separated by an insulating layer.

In some embodiments, the optical support structure is further defined by a layer of silicon deposited on a top electrode of the two electrodes, a layer of titanium dioxide deposited on the layer of silicon, and a layer of silicon dioxide deposited on the layer of titanium dioxide.

In yet another form, the present disclosure provides a multi-modal biosensor chip that includes a vibrating plate orientated along a plane. An array of actuators interfaced with the vibrating plate. Each actuator in the array of actuators is affixed to a different region of the vibrating plate and operates to vibrate the corresponding region of the vibrating plate. Each actuator of the array of actuators includes two electrodes. An array of optical support structures where each optical support structure in the array of optical support structures is rigidly affixed to a corresponding region of the vibrating plate and provides an outwardly facing surface to receive a measurement sample. A light source configured to project light onto each of the outwardly facing surfaces of the array of optical support structures. A light detector configured to capture light reflected from each of the outwardly facing surfaces of the array of optical support structures. A controller interfaced with each actuator of the array of actuators and the light detector. The controller operates to detect changes in vibrating motion of the corresponding region of the vibrating plate concurrently with detecting changes in the light captured by the light detector.

In yet another form, the present disclosure provides a method for multi-modal biosensing that includes providing a vibrating plate orientated along a plane. Vibrating the vibrating plate along the plane with an actuator. Rigidly affixing an optical support structure to the vibrating plate. The support structure provides an outwardly facing surface to receive a measurement sample. Projecting light onto the outwardly facing surface of the optical support structure from a light source. Capturing light reflected from the outwardly facing surface of the optical support structure by a light detector. Detecting changes in vibrating motion of the vibrating plate concurrently with detecting changes in the light captured by the light detector.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIGS. 2A and 2B are diagrams depicting an example embodiment of the proposed multi-modal biosensor;

FIG. 2C is a graph showing an interference pattern of the light reflected from the proposed multi-modal biosensor;

FIGS. 7A-7H are diagrams depicting a fabrication method for the acoustic sensing element;

FIG. 8A-8D are diagrams depicting a fabrication method for the optical support structure;

Corresponding reference numerals indicate corresponding parts throughout the several views of the drawings.

DETAILED DESCRIPTION

Example embodiments will now be described more fully with reference to the accompanying drawings.

Figure 1:
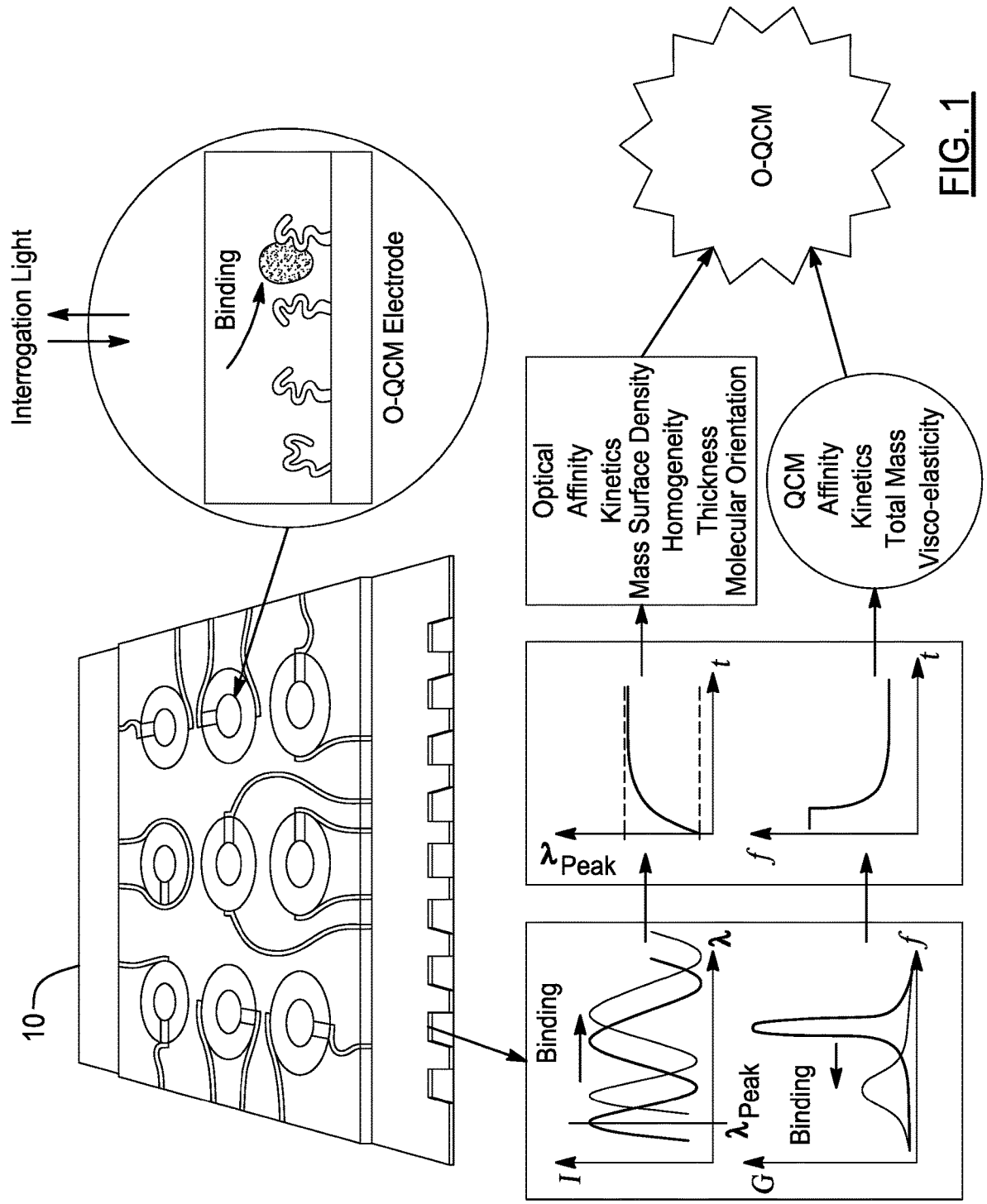
FIG. 1 is a diagram conceptually illustrating a proposed multi-modal biosensor.

FIG. 1 conceptually illustrates a proposed multi-modal biosensor 10. The multi-modal biosensor 10 integrates complementary optical and acoustic label free sensing technologies onto a single platform. The optical component of the multi-modal biosensor 10 measures the density of the "dry" mass, inhomogeneity (e.g., determining the spatial resolution by the imaging system), and orientation of the molecules on the sensor surface; whereas, the acoustic component (e.g., quartz crystal microbalance (QCM)) measures the total "wet" mass (e.g., taking into account the solvent trapped by the biomolecules) and viscoelastic properties of the sensing interface. Working in sync, the multi-modal biosensor 10 is able to provide complementary information about molecular surface density, thickness, volume, conformational change, hydration, orientation, and binding kinetics and affinity which will allow the mechanistic details of binding reactions to be obtained.

In one example, the acoustic detector detects so-called "wet" mass. On the other hand, optical measurement is completely insensitive to the solution surrounding the biomolecules (since the solution refractive index remains the same during bio-interactions); therefore, it measures the "dry" mass (or true molecular mass). As a result, the multi-modal biosensor 10 enables accurate assessment of the actual mass and the degree of hydration of biomolecules on the sensor surface.

In another example, the acoustic detector of the multi-modal biosensor 10 is sensitive to various changes in mass. However, it fails to respond when molecules undergo only conformational changes without any net mass change. The optical measurement, in contrast, is highly responsive to such conformational changes (e.g., thickness change), thus revealing elusive structural changes that often occur during bio-interactions. The mass sensitivity of the acoustic detector is highly dependent upon the molecule's position on the sensor surface (e.g., center vs. edge). With the knowledge of the molecule surface distribution on the multi-modal biosensor 10, which can easily be obtained with the optical detection based on the imaging method, the mechanical response of the multi-modal biosensor 10 can be analyzed more accurately.

In yet another example, the acoustic measurement does not provide the molecular orientation on the sensor surface. However, molecular orientation can be resolved using polarization-based optical measurement. Generally, it is very difficult for a typical label free biosensor to distinguish between specific and non-specific binding. In contrast, acoustic detection in the proposed multi-modal biosensor 10 detects the biomolecular mass change on the sensor surface, regardless of specific or non-specific binding; whereas optical detection measures both biomolecular mass (regardless of specific or non-specific binding) and the conformation change (which is usually caused by specific binding). Therefore, the combination of acoustic and optical measurement allows a user to distinguish out specific binding, through which the binding strength of two binding partners can be investigated.

FIGS. 2A and 2B illustrate the operation of the multi-modal biosensor 10. The multi-modal biosensor 10 includes an optical support structure 21 fabricated on top of a vibrating plate 22. More specifically, the optical support structure 21 is rigidly affixed to an electrode 23 which is in turn rigidly affixed to the vibrating plate 22. The optical support structure 21 also provides an outwardly facing surface 24 to receive or support a measurement sample 25.

The vibrating plate 22 vibrates in the thickness-shear-mode along a horizontal plane and the optical support structure 21, which is rigidly affixed to the electrode 23, is configured to vibrate mechanically with the vibrating plate 22. While the thickness-shear-mode vibrates along the horizontal plane, it is envisioned that other acoustic wave propagation modes may be used to drive the plate. For example, other acoustic wave propagation modes include, but are not limited to flexural-plate-wave-mode, surface-acoustic-wave-mode, or shear-horizontal-acoustic-plate-mode.

To ensure correspondence between the optical support structure 21 and the vibrating plate 22, one or more design methods may be applied to the optical support structure 21. In one embodiment, the thickness of the optical support structure 21 is designed thin in relation to the vibrating plate 22. In another embodiment, the thickness of the optical support structure 21 is preferably less than ten microns. The mass of the optical support structure 21 is typically less than five percent and may be up to ten percent of the mass of the vibrating plate 22. Other techniques may also be applied to the design of the optical support structure 21 as depicted in FIGS. 4A-4H and 5A-5H, and discussed further below.

In this arrangement, multiplexed optical detection may be accomplished using an optical imaging method. Interrogating light is projected onto the outwardly facing surface 24 of the optical support structure 21. The reflected light from the top and bottom surface of the optical support structure 21 forms an interference pattern at an imager 26 or light detector. The reflected light from the measurement sample 25 and an outwardly facing surface 24 forms the interference pattern seen at the imager 26 or light detector. When biomolecules or other measurement samples are attached to the outwardly facing surface 24, the interference pattern changes as shown in FIG. 2C and thereby generates an optical sensing signal. The optical sensing signal may provide thickness and refractive index related to a biomolecule's "dry" mass. Since the optical sensing signal is based on imaging, it can also provide the molecule's spatial distribution on the optical support structure 21. In addition, spots as small as only a few tens of microns in size may be measured simultaneously using a CMOS imager. Finally, using an oblique incident beam with two polarizations, the molecule's orientation on the surface may also be resolved, as the optical phase change (e.g, interference pattern change) is different for the polarization parallel and perpendicular to the molecular orientation.

Figure 3:
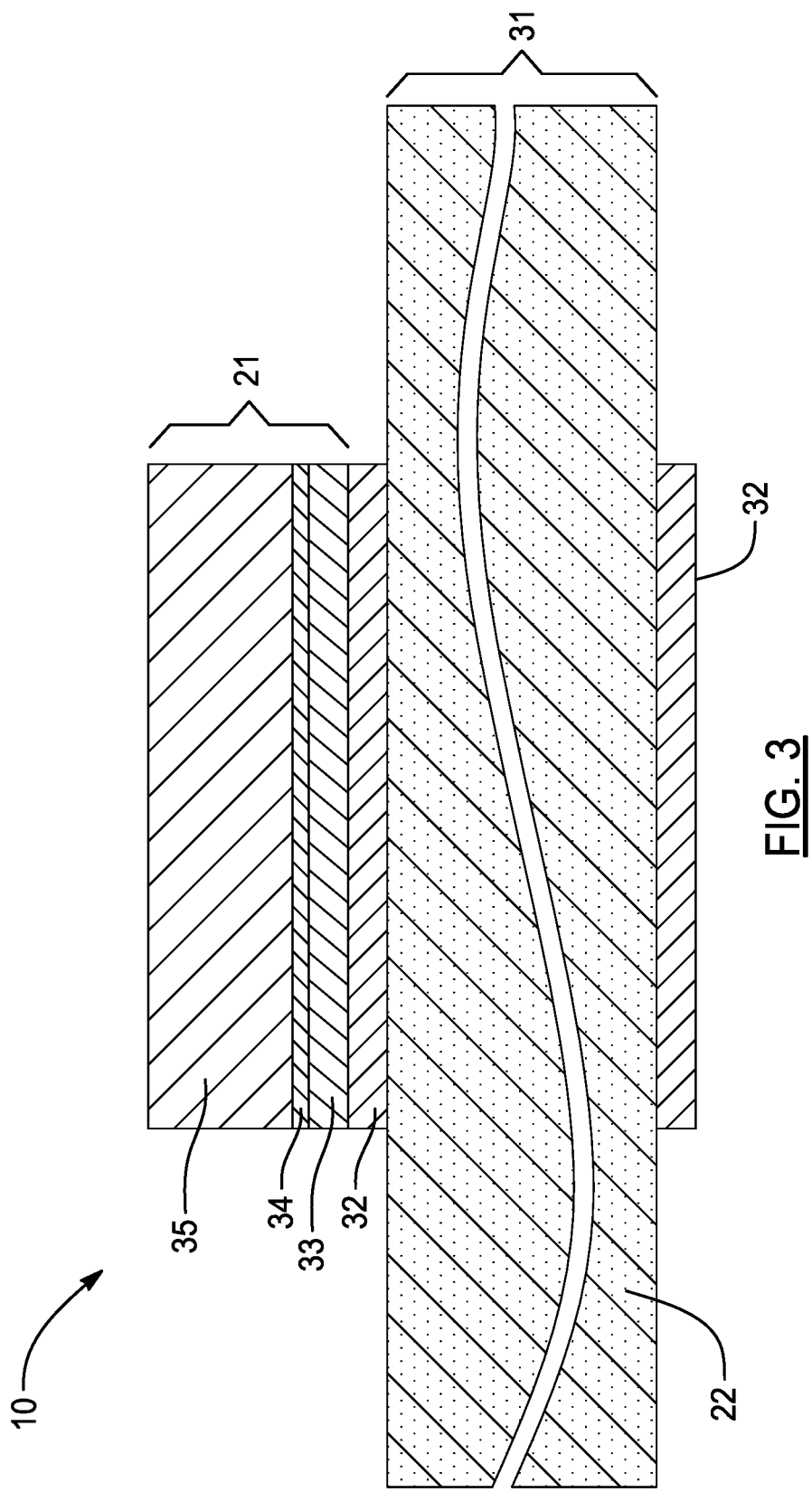
FIG. 3 is a cross-sectional view of an example embodiment of the multi-modal biosensor.

Referring now to FIG. 3, a cross-sectional view of an example embodiment of the multi-modal biosensor 10 is presented. The multi-modal biosensor 10 includes the optical support structure 21, an acoustic sensing element 31, and two electrodes 32. The optical support structure 21 is fabricated on top of the acoustic sensing element 31. In this embodiment, the optical support structure provides an outwardly facing surface to receive a measurement sample. The acoustic sensing element 31 is comprised of a vibrating plate 22 with two electrodes 32 disposed on opposing surfaces of the vibrating plate 22. More specifically, the vibrating plate 22 is an AT-cut quartz crystal shaped as a circular plate with a one inch diameter and a 185 µm thickness. The vibrating plate 22 is patterned with tantalum electrodes on both sides of the plate. The two electrodes 32 have a thickness on the order of 100 nm. A layer of titanium may be interposed between the quartz and tantalum and serve as an adhesion layer. Although the multi-modal biosensor 10 is shown in the horizontal orientation in FIG. 3, it is envisioned that the multi-modal biosensor 10 may be orientated in any direction.

Figure 4D:
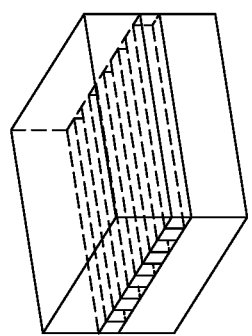
FIG. 4A-4H are diagrams depicting various embodiments of an optical support structure fabricated on top of a vibrating plate.
Figure 4H:
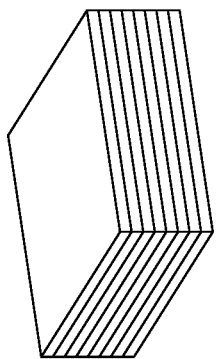
Figure 4C:
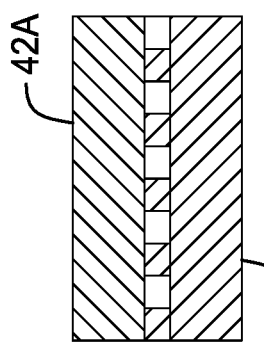
Figure 4G:
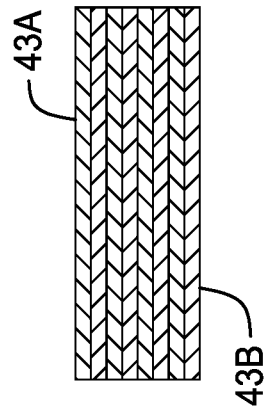
Figure 4B:
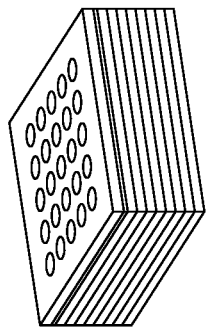
Figure 4F:
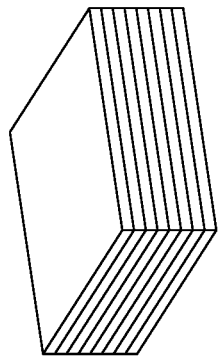
Figure 4A:
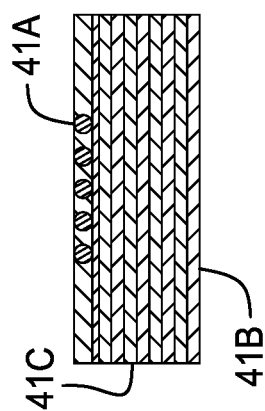

Referring now to FIG. 4A-4H, diagrams depicting alternative embodiments of the optical support structure which can be fabricated on the vibrating plate are presented. FIGS. 4A and 4B depict a cross-sectional and perspective view, respectively, of a hyperbolic metamaterial (HMM) with a two-dimensional grating coupler 41A. The HMM comprises of alternating layers of dielectric material 41B and metal material 41C through the two-dimensional grating coupler 41A. The dielectric material 41B may include $SiO_2$ or $TiO_2$; while the metal material 41C may include gold or silver. The two-dimensional grating coupler 41A allows the interrogating light to easily travel through the HMM, changing the interference pattern. FIGS. 4C and 4D depict a cross-sectional and perspective view, respectively, of a resonant waveguide grating (RWG). The RWG comprises of dielectric grating 42A embedded on top of a dielectric bulk structure 42B. The dielectric grating 42A is comprised of a single layer of $TiO_2$, while the dielectric bulk structure 42B is comprised of a single layer of quartz. The RWG structure vibrates in the thickness-shear-mode or shear-horizontal-acoustic-plate-mode.

Figure 4E:
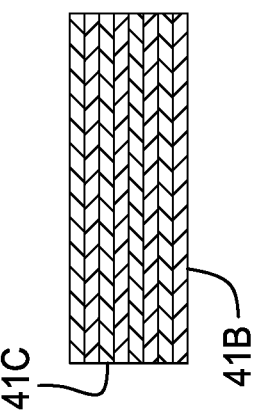

FIGS. 4E and 4F depict a cross-sectional and perspective view, respectively, of a HMM without a grating coupler. The HMM without a grating coupler comprises of alternating layers of dielectric material 41B and metal material 41C. Without the grating coupler, the interrogating light has to travel through the alternating layers of dielectric material yielding a different interference pattern than the HMM with the two-dimensional grating coupler. FIGS. 4G and 4H depict a cross-sectional and perspective view, respectively, of a one-dimensional planar photonic crystal which comprises of alternating layers of high refractive index 43A and low refractive index 43B dielectric material. The high refractive index 43A dielectric material is comprised of $TiO_2$ and the low refractive index 43B dielectric material is comprised of $SiO_2$. Thickness of the high refractive index 43A and the low refractive index 43B are typically 25% of the wavelength of the interference pattern. Photonic bandgaps can be observed on the interference pattern.

Figure 5A:
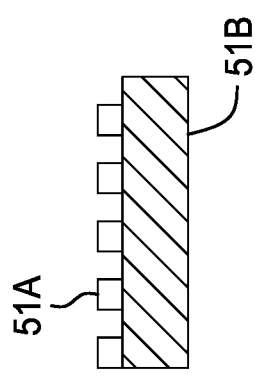
FIG. 5A-5H are diagrams depicting additional various embodiments of the optical support structure fabricated on top of the vibrating plate.
Figure 5B:
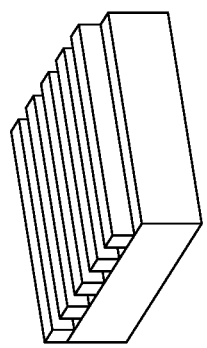
Figure 5C:
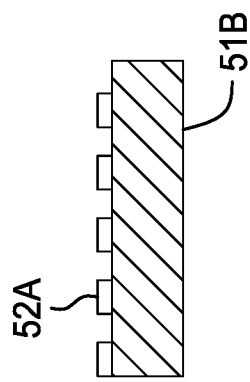
Figure 5D:
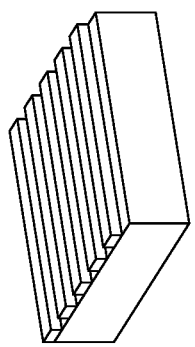
Figure 5E:
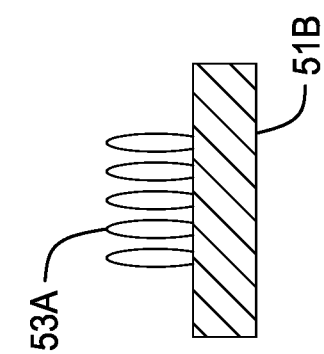
Figure 5F:
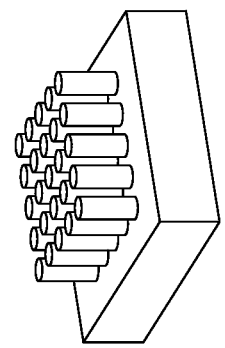
Figure 5G:
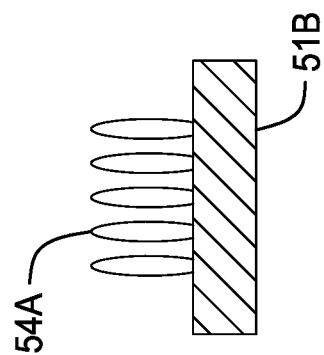
Figure 5H:
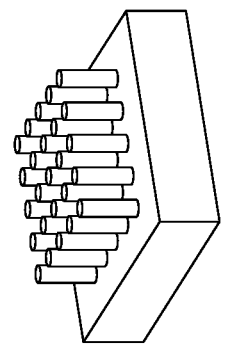

Referring now to FIG. 5A-5H, diagrams depicting additional various embodiments of the optical support structure fabricated on the vibrating plate are presented. FIGS. 5A and 5B depict a cross-sectional and perspective view, respectively, of a one-dimensional dielectric grating which comprises of a dielectric structure 51A on a dielectric substrate 51B. The dielectric grating is exposed directly to the interrogating light. FIGS. 5C and 5D depict a cross-sectional and perspective view, respectively, of a one-dimensional plasmonic grating which comprises of a metal structure 52A on the dielectric substrate 51B. By using the metal structure 52A rather than a dielectric structure 51A, a different interference pattern may be observed at the same wavelength. FIGS. 5E and 5F depict a cross-sectional and perspective view, respectively, of a two-dimensional dielectric nanopillar array which comprises of nanopillars 53A of dielectric material on top of dielectric substrate 51B. The two-dimensional dielectric nanopillar array allows for increased surface area, thus enabling it to have a sensitive interference pattern. FIGS. 5G and 5H depict a cross-sectional and perspective view, respectively, of a two-dimensional plasmonic nanopillar array. The two-dimensional plasmonic nanopillar array comprises of metallic or metal coated 54B nanopillars on top of a dielectric substrate 51B. The metal coated 54B nanopillars produce different widths on the interference pattern.

Figure 6A:
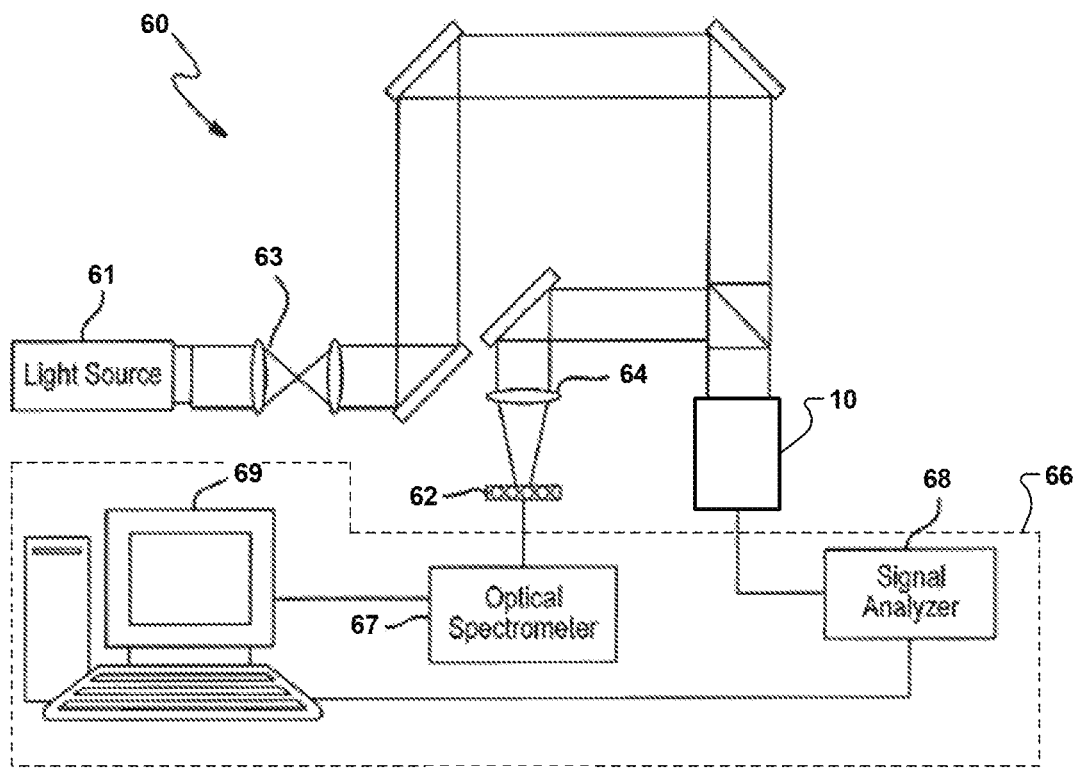
FIG. 6A is a schematic of an example embodiment of the proposed multi-modal biosensor system.
Figure 6B:
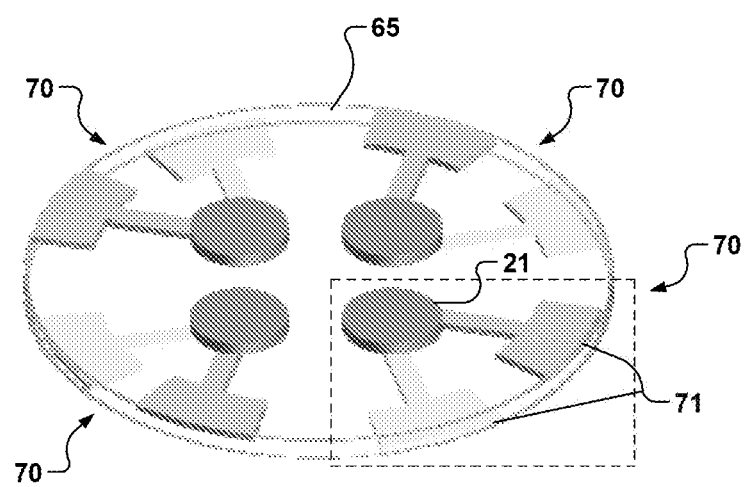
FIG. 6B is a cross-sectional view of an array of optical support structures formed onto a single chip.

FIG. 6A depicts a schematic of an example embodiment of the proposed multi-modal biosensor system 60. The multi-modal biosensor system 60 includes an imaging subsystem, the multi-modal biosensor 10, and a controller 66. The multi-modal biosensor system 60 performs acoustic and optical measurements concurrently.

The imaging subsystem includes a light source 61 and a light detector 62. The light source 61 is configured to project the interrogating light onto the optical support structure and the light detector 62 is configured to capture the light reflected from the optical support structure or the measurement sample thereon. In one embodiment, the light source 61 is a helium-neon laser and the light detector 62 is a CMOS imager although other types of light sources and light detectors are contemplated by this disclosure. To direct and focus the interrogating light, one or more collimating lenses 63 as well as other optics may be interposed on the light path between the light source 61 and the light detector 62. Likewise, one or more focusing lenses 64 may be used to direct and focus the reflected light onto the light detector 62.

The multi-modal biosensor 10 includes the vibrating plate orientated in a horizontal plane and an actuator interfaced with the vibrating plate to cause the vibrating plate to vibrate along the horizontal plane. Although the vibrating plate is described as vibrating along the horizontal plane, it is envisioned that this approach may be extended along other planes (e.g., vertical). In one embodiment, the multi-modal biosensor 10 is further defined as a quartz crystal microbalance (QCM) that measures a mass variation per unit area by measuring changes in frequency of the vibrating plate. In this embodiment, the vibrating plate 22 is comprised of quartz and the actuator is formed by two electrodes 32 disposed on opposing surfaces of the vibrating plate 22, as shown in FIG. 3. In operation, a voltage is applied across the two electrodes 32 causing the quartz to vibrate. Additionally, the two electrodes 32 may also serve to detect the frequency of the vibrating plate 22. Although the vibrating plate 22 is described as being comprised of quartz, it is envisioned that the vibrating plate 22 may be implemented using other types of piezoelectric materials.

In another embodiment, a single chip includes an array of multi-modal biosensors 70 configured to perform multiple multi-modal biosensing calculations in a multiplexed manner. Each multi-modal biosensor in the array of multi-modal biosensors 70 includes the optical support structure 21 and a pair of electrodes 71. Each pair of electrodes 71 is coupled to a corresponding region of a vibrating plate 65. Likewise, each optical support structure 21 is fabricated on top of the corresponding region of the vibrating plate 65. The system may be arranged such that a single interrogating light beam is projected onto the array of multi-modal biosensors 70. As a voltage is applied across each pair of electrodes 71, the corresponding region of the vibrating plate 65 begins to vibrate. Each corresponding region of the vibrating plate 65 may vibrate independently of the entire vibrating plate 65. Additionally, each corresponding region of the vibrating plate 65 may vibrate at a single speed/frequency because of the uniform thickness of the vibrating plate 65. Alternatively, each corresponding region of the vibrating plate 65 may have varying thickness, allowing the corresponding region of the vibrating plate 65 to vibrate at multiple speeds/frequencies. A light detector may be configured to capture the light reflected by each of the optical support structures 21 in the array of multi-modal biosensors 70. Alternatively, an array of light detectors may be used to capture light reflected by the array of multi-modal biosensors 70, such that there is a one to one correspondence between a light detector and a multi-modal biosensor.

As opposed to projecting a single interrogating light beam onto the array of multi-modal biosensors 70, the system may be arranged to project a plurality of interrogating light beams onto the array of multi-modal biosensors 70, such that each interrogating light beam is incident upon a different multi-modal biosensor in the array of multi-modal biosensors 70. Likewise, an array of light detectors may be used to capture light reflected by the array of multi-modal biosensors, such that there is a one to one correspondence between a light detector and a multi-modal biosensor.

The controller 66 includes an optical spectrometer 67, a signal analyzer 68, and a general purpose computer 69. The controller 66 is configured to receive imaging data from the light detector 62 and frequency data of the vibrating plate from the multi-modal biosensor 10. As noted above, the reflected light from the optical support structure forms the interference pattern at the light detector 62. When a measurement sample is placed on the optical support structure, the interference pattern changes and is detected by the controller 66. Thickness and refractive index information for the measurement sample may be derived from the interference pattern changes, as discussed further below. In an example embodiment, the image data is analyzed by the optical spectrometer 67, although other types of measurement devices also fall within the scope of this disclosure.

Concurrently with detecting changes in the interference pattern, the controller 66 also determines the frequency of the vibrating plate and detects any changes in the frequency. Changes in frequency correlate to a mass variation caused by the measurement sample being placed on the optical support structure. QCM frequency response is sensitive not only to mass loading, but also to changes in solution density and viscosity at the two electrodes. In an example embodiment, the frequency of the vibrating plate may be determined by the signal analyzer 68 (e.g., Agilent 4395A signal analyzer), although other types of measurement devices also fall within the scope of this disclosure.

When the interrogating light is projected onto the outwardly facing surface of the optical support structure, the reflected light may be distorted due to the reflective property of the two electrodes, causing undesired interference in the optical sensing signal. In addition, the interrogating light may be transmitted through the measurement sample and into the acoustic sensing element causing undesired interference in the acoustic signal. To eliminate the interference in the optical support structure and the acoustic sensing element, an optical isolation layer is coated on an outwardly facing surface of a top electrode of the two electrodes. The optical isolation layer is coated with an absorptive material and prevents the interrogating light from reaching the top electrode. The optical isolation layer comprises of sputtered silicon, titanium dioxide, or other absorptive material. Thus, the optical and acoustic measurements are independent and do not interfere with each other. Each detection mode may be tailored separately for different applications, thereby enhancing the flexibility of the multi-modal biosensor.

Furthermore, the QCM may also measure the damping of the oscillation. The measurement sample moves synchronously with the thickness-shear-mode vibrating plate. The signal analyzer may be used to validate the use of the Sauerbrey equation (1) (as described below) by characterization of any changes in energy loss upon the binding of antigen to antibody. The signal analyzer 68 determines the electroacoustic impedance or admittance spectrum over a specified frequency range in the vicinity of crystal resonance. By comparing the shape of the spectrum of the perturbed resonator to an unperturbed device, a user may explore the validity of equation (1).

Figure 9:
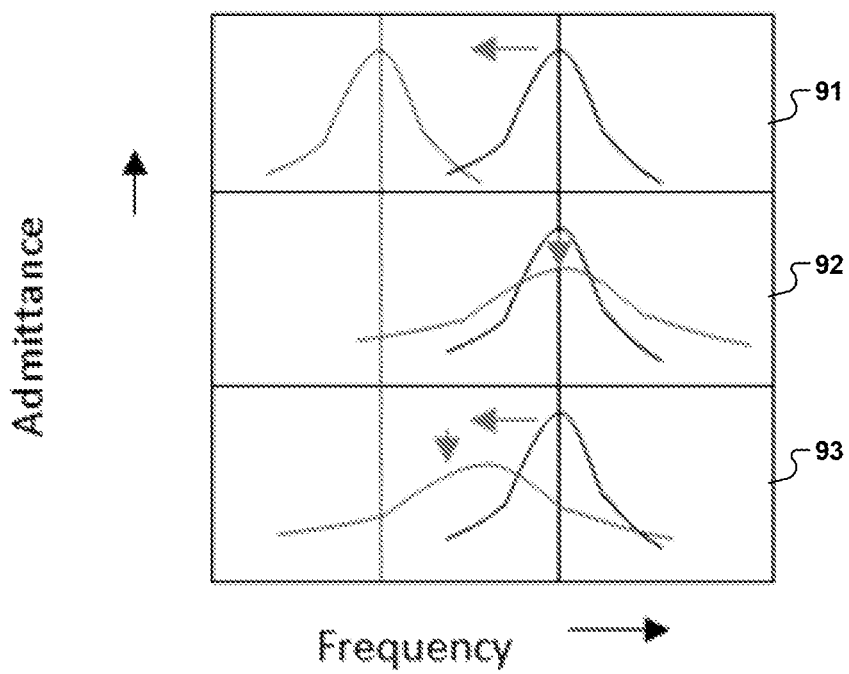
FIG. 9 is a graph illustrating a frequency response of a crystal oscillator.

Referring now to FIG. 9, a graph illustrating a frequency response of a crystal oscillator is presented. A characteristic of a rigidly coupled mass layer is to keep the original shape of the frequency response but to transform it to a lower frequency by using a purely gravimetric material 91. Damping of the crystal oscillation is a characteristic of a fluid or viscoelastic material 92 and results in a shape change in the frequency response of the crystal oscillator. Simultaneous gravimetric and viscoelastic changes 93 result in both peak position and shape changes in the frequency response of the crystal oscillator.

The QCM frequency response is not only sensitive to mass loading but also to changes in solution density and viscosity at the electrode. A series of equivalent circuit parameters and a modified Butterworth Van Dyke model may be used to determine characterization, such as mass and liquid loading, of QCM in viscoelastic fluid. For example, the relationship between changes of the resonant frequency $\Delta f_0$, and those of motional resistance $\Delta R_1$ due to net changes in solution density and viscosity, may be obtained using the equation:

$$\frac{\Delta f_0}{\Delta R_1} = -\frac{\sqrt{\bar{c}_{66} f_{0g}}}{4\pi L_q \sqrt{f \mu_q}} \quad (1)$$

where $L_q$ and $f_{0g}$ are the motional inductance and resonant frequency of the crystal in air, respectively, f is the excitation frequency, $\mu_q$ is the shear modulus for AT-cut quartz (e.g., $2.947 \times 10^{10}$ N/m²), $\bar{c}_{66}$ is the piezoelectric stiffened elastic constant (e.g., $2.957 \times 10^{10}$ N/m²), and $f_{0g}$ may be approximately used in the calculation instead of f with error below ca. 0.3%. With these values being plugged into equation (1), the result is $\Delta R_1 \approx -4\pi L_q \Delta f_0$. The frequency resistance slope $|\Delta f_0/\Delta R_1|$, may be used as a quantitative representation of whether the changes in frequency can be assigned to the mass changes in the film or the viscosity variations at the interface. As $\Delta R_1$ value is approximately zero for an ideal rigid film, the $\Delta f_0$ can only be assigned to mass changes. This means that the smaller the $\Delta R_1$ is, the more rigid the thin film is, and more dominantly the response is due to mass. As $\Delta R_1$ approaches larger values, the $|\Delta f_0/\Delta R_1|$ gets smaller reaching a threshold value below which the frequency response may predominantly be assigned to viscodensity fluctuations of the system. For example, if a 10 MHz crystal is used, the threshold value of the slope $|\Delta f_0/\Delta R_1|$ is 11.6 which reflects the contribution of density and viscosity in the measurement. Thus, if the slope is bigger than the absolute value of $|\Delta f_0/\Delta R_1|=11.6$ Hz$\Omega^{-1}$, the frequency changes may be predominantly caused by the mass effect.

Data from the optical spectrometer 67 as well as data from the signal analyzer 68 may be passed along to the computing device 69 (e.g., PC) for additional processing. Although, the controller 66 is collectively formed by the optical spectrometer 67, the signal analyzer 68, the computing device 69, it is envisioned that one or more of these components may be replaced by a different type of measurement device. In other arrangements, these components and their functionality may be integrated into a single device.

Fabrication of the two electrodes 32 is further described in relation to FIGS. 7A-7H. Two electrodes 32 on each side of the crystal are first fabricated. At the beginning of each lithography step, the crystal is first cleaned with acetone and isopropyl alcohol, then baked at 115° C. to remove moisture prior to spin-coating the resist. A bilayer lift-off process is used to pattern and deposit the two electrodes 32 (e.g., 10 nm titanium/100 nm tantalum) on both sides of the AT-cut quartz wafer. The masks used to pattern and deposit the two electrodes 32 and optical coatings are made using the Heidelberg pPG 501 Mask Maker. On each side, the procedure for fabricating the electrode is as follows.

First, LOR 10B 72 (Microchem, resist 1) is spin-coated onto the crystal at 4000 RPM for 30 seconds, then soft-baked at 190° C. for 5 minutes, followed by S1813 73 (resist 2) spin-coated at 4000 RPM for 30 seconds, then baked at 115° C. for 4 minutes as shown in FIG. 7A. In FIG. 7B, the resist bi-layer is exposed using a Karl Suss MA/BA6 Mask/Bond Aligner (9 seconds exposure time), and the exposed resist is puddle-developed in AZ726 (Microchem) for 50 seconds to define the electrode pattern.

Next, 10 nm of Ti (serving as an adhesion layer), followed by 100 nm of Ta, collectively referred to as 10 nm Ti/100 nm Ta layer 74, is sputtered onto the patterned substrate using a Kurt J. Lesker Lab 18-01 sputter tool to form the electrode as shown in FIG. 7C. Lift-off is performed by sonicating the device in Remover PG (Microchem) for 1.5 hours to remove the extra metal, leaving behind the patterned electrode shown in FIG. 7D. Referring to FIGS. 7E-7H, the crystal is then turned upside down, and the above steps are repeated on the other side of the wafer to fabricate the backside electrode. Additionally, the two electrodes 32 may be configured as sensing electrodes for determining the vibrating frequency of the vibrating plate. Other types of fabrication methods and materials for constructing the acoustic sensing elements are contemplated by this disclosure.

Referring again to FIG. 3, the optical support structure 21 is comprised of three layers. A layer of silicon 33 is disposed on the top electrode of two electrodes 32 followed by a thinner layer of titanium dioxide 34. The layer of silicon 33 has a thickness on the order of 100 nm and the titanium dioxide 34 has a thickness on the order of 30 nm. A layer of silicon dioxide 35 having a thickness on the order of 400 nm is disposed on top of the titanium dioxide 34.

Referring now to FIGS. 8A-8D, diagrams depicting a fabrication method for the optical support structure 21 are presented. The fabrication of the optical support structure 21 follows a similar process to the fabrication of the two electrodes 32, with changes in the resist spin-coating parameters and deposited materials. First, LOR 10B 72 (Microchem) is spin-coated onto the crystal at 2000 RPM for 30 seconds, then soft-baked at 190° C. for 5 minutes, followed by S1813 73 spin-coated at 4000 RPM for 30 seconds, then baked at 115° C. for 4 minutes as shown in FIG. 8A. The resist bi-layer is exposed using a Karl Suss MA/BA6 Mask/Bond Aligner with 9 seconds exposure time, and the exposed resist was puddle-developed in AZ726 (Microchem) for 50 seconds to define the sensing area pattern in FIG. 8B.

Next, 10 nm of Ti (serving as an adhesion layer), followed by 100 nm of amorphous silicon, collectively referred to as 10 nm Ti/100 nm Si layer 75, is sputtered onto the patterned substrate using the Lab 18-01 to form the first optical layer. The second optical layer 76 (30 nm $TiO_2$/400 nm $SiO_2$) is evaporated using a SJ-26 evaporator as shown in FIG. 8C. Lift-off is performed by sonicating the device in Remover PG (Microchem) for 1.5 hours to remove the extra metal, leaving behind the patterned electrode shown in FIG. 8D. Likewise, other types of fabrication methods and materials for constructing the optical support structure are contemplated by this disclosure.

Figure 10:
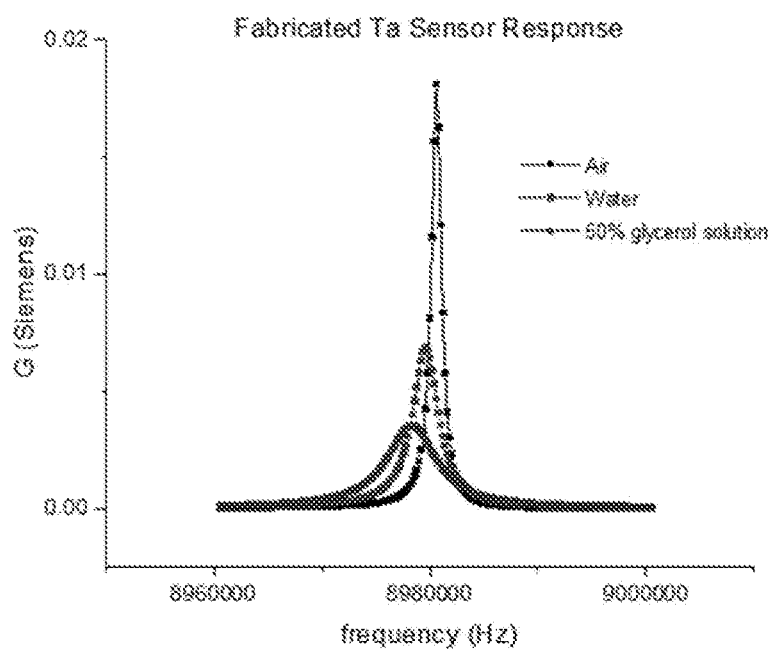
FIG. 10 is a graph illustrating a frequency response of the acoustic sensing element without the optical support structure.
Figure 11:
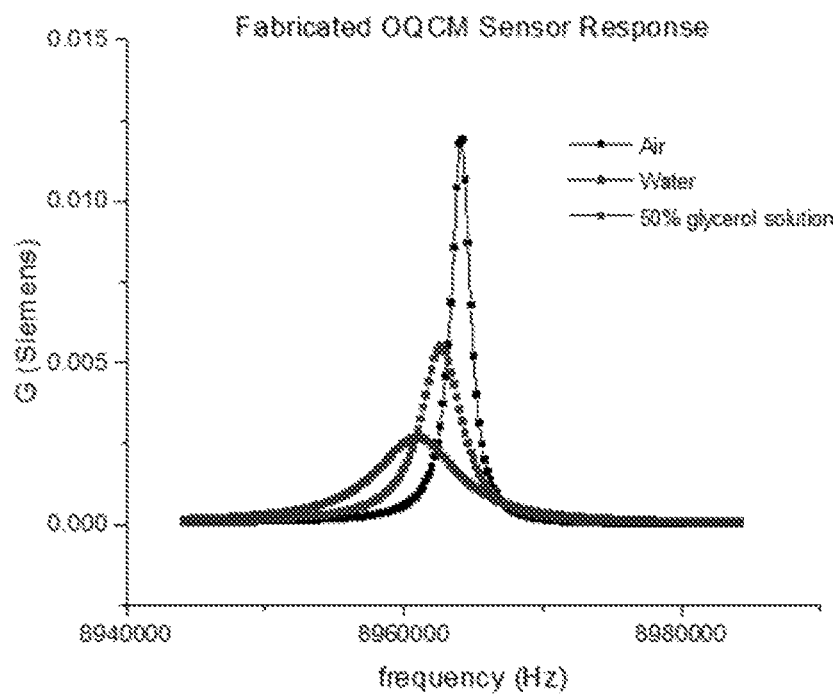
FIG. 11 is a graph illustrating a frequency response of the acoustic sensing element with the optical support structure.

Test results for the example embodiment of the multi-modal biosensor are set forth below. First, the mechanical response of the multi-modal biosensor was measured using an Agilent 4395A network analyzer and compared with that of a bare Ta crystal whose electrode fabrication was done in the same manner as the multi-modal biosensor. With reference to FIGS. 10 and 11, the frequency response was measured for an acoustic sensing element without and with the optical support structure, respectively. In each case, the frequency response was measured for air, water, and a 50% (by volume) glycerol/water solution. The peak value for air, water, and 50% glycerol/water solution occurred at a lower frequency for the acoustic sensing element with the optical support structure. For example, the peak value for a sample placed in air occurred at 8.9641 MHz for the acoustic sensing element having the optical support structure compared to 8.9806 MHz for the acoustic sensing element without the optical support structure.

Figure 12:
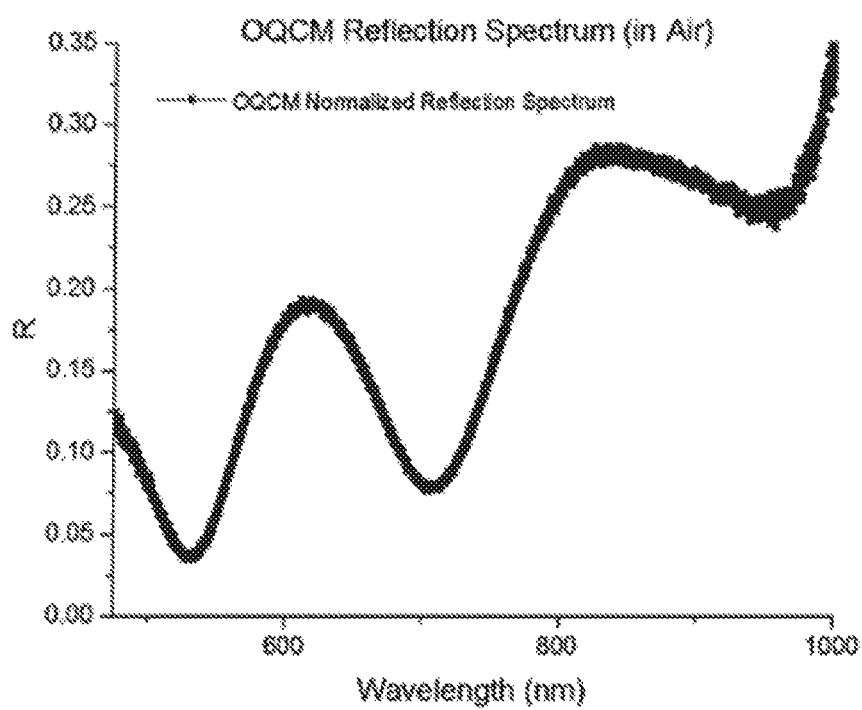
FIG. 12 is a graph illustrating a reflection spectrum of the proposed multi-modal biosensor.

To measure the interference pattern of the multi-modal biosensor, collimated white light from a halogen light source (HL-2000, Ocean Optics) was incident in a 2 mm diameter spot size on the sample. The reflected light was collected using a multimode fiber (Ocean Optics) and sent to a USB spectrometer. A multiple-beam interference pattern is generated from the reflections at the interfaces ($SiO_2$/water (protein)(air), $SiO_2$/$TiO_2$, Si/$TiO_2$, Si/Ta) on the electrode. The reflection spectrum of the device in air is shown in FIG. 12.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. A multi-modal biosensor system, comprising:
a vibrating plate orientated along a plane;
an actuator interfaced with the vibrating plate and operable to vibrate the vibrating plate along the plane, wherein the actuator includes two electrodes affixed to the vibrating plate;
an optical support structure rigidly affixed to the vibrating plate, wherein the optical support structure provides an outwardly facing surface to receive a measurement sample;
a light source configured to project light onto the outwardly facing surface of the optical support structure;
a light detector configured to capture light reflected from the outwardly facing surface of the optical support structure; and
a controller interface with the two electrodes and the light detector, wherein the controller operates to detect changes in vibrating motion of the vibrating plate concurrently with detecting changes in the light captured by the light detector to thereby analyze the measurement sample.

2. The multi-modal biosensor system of claim 1, wherein the two electrodes are comprised of a top electrode and a bottom electrode coated on opposing surfaces of the vibrating plate.

3. The multi-modal biosensor system of claim 2, further comprising an optical isolation layer coated on the top electrode;
wherein the optical isolation layer prevents light from reaching the top electrode.

4. The multi-modal biosensor system of claim 3, wherein the vibrating plate is comprised of piezoelectric material.

5. The multi-modal biosensor system of claim 3, wherein the actuator causes the vibrating plate to vibrate in a mode selected from the group consisting of thickness-shear-mode, flexural-plate-wave-mode, surface-acoustic-wave-mode, and shear-horizontal-acoustic-plate-mode.

6. The multi-modal biosensor system of claim 3, wherein light incident upon the outwardly facing surface of the optical support structure is polarized.

7. The multi-modal biosensor system of claim 3, wherein the optical support structure is comprised of at least one layer of dielectric material.

8. The multi-modal biosensor system of claim 3, wherein the optical support structure is comprised of a grating material.

9. The multi-modal biosensor system of claim 3, wherein the optical support structure is comprised of alternating layers of dielectric material and metal material.

10. The multi-modal biosensor system of claim 3, wherein mass of the optical support structure is less than ten percent of mass of the vibrating plate.

11. The multi-modal biosensor system of claim 3, wherein thickness of the optical support structure is on the order of two microns.

12. The multi-modal biosensor system of claim 3, wherein thickness of the optical support structure is less than ten microns.

13. The multi-modal biosensor system of claim 3, wherein the optical support structure is comprised of two layers of a metal material separated by an insulating layer.

14. The multi-modal biosensor system of claim 3, wherein the optical support structure is further defined by a layer of silicon deposited on the top electrode, a layer of titanium dioxide deposited on the layer of silicon, and a layer of silicon dioxide deposited on the layer of titanium dioxide.

15. A biosensor, comprising:
a vibrating plate orientated along a plane, wherein the vibrating plate comprises piezoelectric material;
an actuator interfaced with the vibrating plate and operated to cause the vibrating plate to vibrate along the plane, wherein the actuator includes two electrodes affixed on opposing surfaces of the vibrating plate;
an optical support structure rigidly affixed to the vibrating plate, wherein the optical support structure provides an outwardly facing surface to receive a measurement sample;
a light source configured to project light onto the outwardly facing surface of the optical support structure;
a light detector configured to capture light reflected from the outwardly facing surface of the optical support structure; and
an optical isolation layer coated on a top electrode of the two electrodes, wherein the optical isolation layer prevents light from reaching the top electrode; and
a controller interface with the two electrodes and the light detector, wherein the controller operates to detect changes in vibrating motion of the vibrating plate concurrently with detecting changes in the light captured by the light detector to thereby analyze the measurement sample.

16. The biosensor of claim 15, wherein the piezoelectric material is comprised of quartz.

17. The biosensor of claim 15, wherein the actuator causes the vibrating plate to vibrate in a mode selected from the group consisting of thickness-shear-mode, flexural-plate-wave-mode, surface-acoustic-wave-mode, and shear-horizontal-acoustic-plate-mode.

18. The biosensor of claim 15, wherein the optical support structure is comprised of a grating material.

19. The biosensor of claim 15, wherein the optical support structure is comprised of alternating layers of dielectric material and metal material.

20. The biosensor of claim 15, wherein mass of the optical support structure is less than ten percent of mass of the vibrating plate.

21. The biosensor of claim 15, wherein thickness of the optical support structure is on the order of two microns.

22. The biosensor of claim 15, wherein thickness of the optical support structure is less than ten microns.

23. The biosensor of claim 15, wherein the optical support structure is comprised of two layers of a metal material separated by an insulating layer.

24. The biosensor of claim 15, wherein the optical support structure is further defined by a layer of silicon deposited on the top electrode, a layer of titanium dioxide deposited on the layer of silicon, and a layer of silicon dioxide deposited on the layer of titanium dioxide.

25. A multi-modal biosensor chip, comprising:
a vibrating plate orientated along a plane;
an array of actuators interfaced with the vibrating plate, each actuator in the array of actuators is affixed to a different region of the vibrating plate and operates to vibrate the corresponding region of the vibrating plate, wherein each actuator of the array of actuators includes two electrodes;
an array of optical support structures, each optical support structure in the array of optical support structures is rigidly affixed to a corresponding region of the vibrating plate and provides an outwardly facing surface to receive a measurement sample;
a light source configured to project light onto each of the outwardly facing surfaces of the array of optical support structures;
a light detector configured to capture light reflected from each of the outwardly facing surfaces of the array of optical support structures; and
a controller interfaced with each actuator of the array of actuators and the light detector, wherein the controller operates to detect changes in vibrating motion of the corresponding region of the vibrating plate concurrently with detecting changes in the light captured by the light detector to thereby analyze the measurement sample.

26. A method for multi-modal biosensing, comprising:
providing a vibrating plate orientated along a plane;
vibrating the vibrating plate along the plane with an actuator;
rigidly affixing an optical support structure to the vibrating plate, wherein the optical support structure provides an outwardly facing surface to receive a measurement sample;
projecting light onto the outwardly facing surface of the optical support structure from a light source;
capturing light reflected from the outwardly facing surface of the optical support structure by a light detector; and
detecting changes in vibrating motion of the vibrating plate concurrently with detecting changes in the light captured by the light detector to thereby analyze the measurement sample.

* * * * *